Aug. 27, 1968 G. WERSCHE 3,398,963

CONNECTION FOR A TONE ARM OF A RECORD CHANGER

Filed Feb. 28, 1967

INVENTOR.
GÜNTER WERSCHE
BY
[signature]
AGENT

United States Patent Office 3,398,963
Patented Aug. 27, 1968

3,398,963
CONNECTION FOR A TONE ARM OF A RECORD CHANGER

Günter Wersche, Berlin, Germany, assignor to North American Philips Company, Inc., New York, N.Y., a corporation of Delaware Filed Feb. 28, 1967, Ser. No. 619,464
Claims priority, application Germany, Mar. 28, 1966, P 39,079
5 Claims. (Cl. 274—23)

ABSTRACT OF THE DISCLOSURE

A connection between the tone arm of a record changer and the support shaft the latter of which is connected to the drive mechanism of a record changer. The tone arm is resiliently clamped to the support shaft such that forces applied to the tone arm during the record change cycle are not imparted to the support shaft and hence the drive mechanism of the record changers. The connection also provides regulation of the angular disposition in a horizontal plane of the tone arm with respect to the shaft thereby insuring proper engagement between the tone arm and the record during the record change cycle.

This invention relates to the connection between a record player tone arm and the pivotal support shaft which transmits movement thereto.

In record changers the danger exists that during the record change cycle that the operator, intentionally or unintentionally, may come into contact with the moving tone arm and thus stop said arm. However, the driving mechanism will continue running. In most record changers the tone arm is driven through a slipping clutch so that when the operator touches the tone arm and stops it, the slipping clutch actuated by the touch against the tone arm ensures that the driving mechanism is swiched off thus preventing an adverse reaction on said mechanism.

However, if the movement of the tone arm during a record change cycle is controlled by a cam disc and is thus positively moved to the position on the record or, after playing, from the end of the record to the tone arm support, a slipping clutch cannot be effectively used to prevent damage to the record player drive mechanism. In such a situation another solution is required to prevent damage to the driving mechanism as a result of obstruction to movement of the tone arm. It is thus necessary to provide a resilient member which, when the tone arm is blocked by influences from without, enables the cam disk to rotate further without hindrance and which, as soon as the tone arm is released again, brings it in the position determined by the cam disk in a resilient manner, and to regulate the placement of the tone arm on the record.

According to the invention, a device for connecting a tone arm of a record changer which is directly and positively linked to a cam disk which insures against overload in the tone arm connection and permits regulation of placement of the tone arm on the record. In one embodiment, a shaft which supports the tone arm has on its side a notch which releasably engages a slide: the latter of which is journalled in a brace which supports the tone arm. The brace is located at right angles to the shaft at the height of the notch and includes a recess surrounding the shaft with clearance. The slide is rotatable about a pin parallel to the shaft which can be forced into the notch of the shaft by the tension of a tensioning spring thus providing a resilient clamping connection between the tone arm and the shaft. In order to regulate placement of the tone arm on the record, the slide can be pivoted relative to the brace by an adjustment screw.

Figure 1:
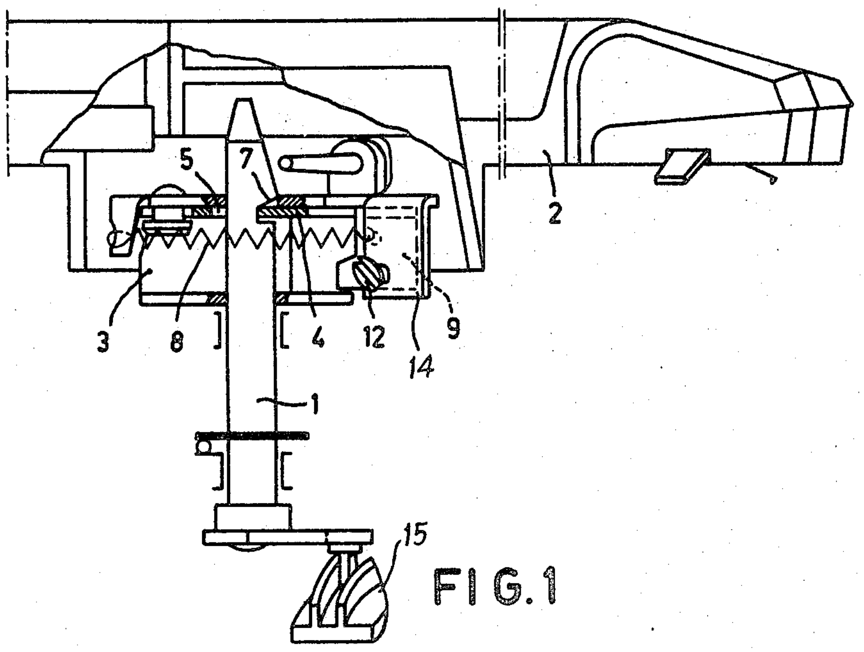
Figure 2:
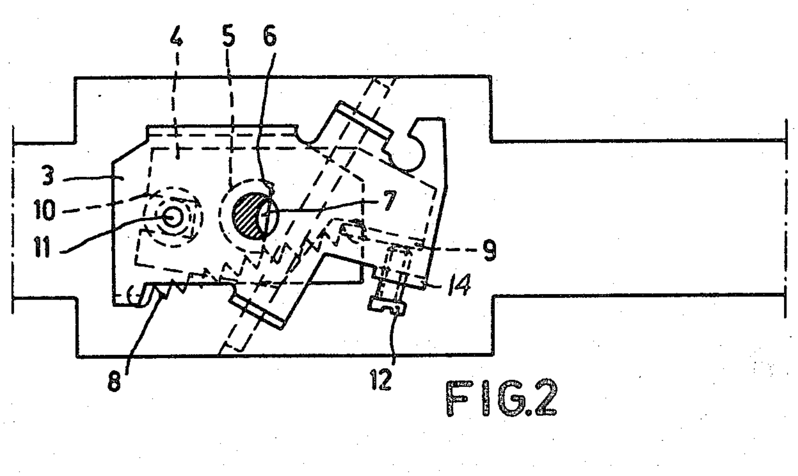

In order that the invention may be readily carried into effect, one embodiment thereof will now be described in greater detail, by way of example, with reference to the accompanying drawing, in which:

FIG. 1 is a cross-sectional view of the connection between the tone arm and a supporting shaft which prevents transmission of forces from the tone arm to the support shaft and provides regulation of tone arm placement on the record, and FIG. 2 is a plan view of the device with a cross-sectional view through the supporting shaft of the tone arm.

Referring to the figures, the shaft 1 serves as a support shaft for the tone arm 2, and is coupled to a cam disk 15 which controls the movement of the shaft 1 during a record change cycle. A brace 3 in the form of a U is secured to the lower side of the tone arm. In the horizontal part of the brace 3 an aperture is provided in which the shaft 1 can both rotate and slide. A slide 4 is journalled in the brace and has an aperture 5 which, for example, as shown in FIGURE 2, has the shape of a segment of a circle and is larger than the supporting shaft 1 extending through said aperture. The chord of said segment serves as an abutment edge 6 for locking the slide 4 in a notch 7 in the supporting shaft. The surface of the notch opposite to the chord preferably is concave to effect a contact in two points.

In a point outside the centre line a tensioning spring 8 is secured to the brace 3 for pulling the slide 4 into the notch when same is at the height of the notch 7, the abutment edge 6 abutting against the bottom of the notch or against the edges of the concave surface. The supporting shaft 1 is then locked both against rotation and against displacement in an axial direction. Since the force of the tensioning spring 8 fastened to the slide is remote from the center of the slide, a clockwise torque will result.

The slide 4 comprises a tag 9 which is bent at right angles and further comprises a slot 10 which embraces a pin 11 secured to the brace 3. The slot 10 is located on the distal side as the tag 9 relative to the aperture 5 which is located approximately in the centre.

As a result of the said clockwise torque the slide 4 is not pulled only towards the supporting shaft 1 but is also rotated about the pin 11 so that as shown in FIGURE 2 the right-hand end of the slide with the tag 9 is slightly pivoted in a clockwise direction. An adjustment screw 12 is screwed in the brace 3, against which the tag 9 is forced by the torque. This particular screw adjustment determines the placement of the tone arm with respect to the chord. That is, placement may be varied by adjusting the adjustment screw 12.

In mounting, the tone arm 2, the brace 3, the slide 4, and the tensioning spring 8 are pressed from above onto the supporting shaft 1 and pushed downwards until the slide 4 fails into the notch 7. To facilitate the connection of the unit on the supporting shaft it is useful to bevel the supporting shaft as shown in FIGURE 1. When the unit is pushed downwards the slide 4 is forced back against the spring force as a result of the bevelled portion of the shaft until it falls into the notch 7.

If the above described connection between the tone arm 2 and the supporting shaft has a force applied thereto which may occur, for example, by manually obstructing movement of the tone arm during operation of the record change cycle, the supporting shaft will rotate with respect to the brace 3 and thus tension the tensioning spring 8 by a displacement of the slide 4. As soon as the tone arm is released it will be returned to its normal position with respect to the brace 4 by the spring force. Relative movement between the shaft 1 and the brace 2 is permissible in both directions of rotation.

In order to determine the proper placement for the tone arm on the record, the adjustment screw 12 fastened to the tab 14 on the bracket is rotated; the end of the screw abuts tag 9 thus pivoting the slide 4 in a lateral plane with respect to the bracket. Hence, the slide 4 and consequently also the abutment edge 6 rotate around the pin 11. By making the distance between the adjustment screw 12 and the pin 11 as large as possible and by using an adjustment screw having the smallest possible pitch, it is possible to accurately adjust the angular position of the tone arm with respect to the record.

What is claimed is:

1. A tone arm connection for a phonograph comprising: a tone arm for a phonograph, a brace having an aperture therethrough connected to said one arm, a pivotal support shaft coupled to the drive mechanism of said phonograph, said support shaft projecting through said aperture in said brace, a slide member journalled in said brace and pivotally mounted relative thereto, wherein said slide member abuts said shaft, and a spring interconnecting said brace and said slide member for normally urging said slide member into said abutting contact with said shaft thereby providing a resilient clamping connection between said shaft and said tone arm.

2. A tone arm connection according to claim 1 wherein said pivotal support shaft has a notch included therein for receiving said slide member, and said slide member has an aperture therethrough surrounding said shaft, wherein the wall of said slide aperture engages said notched portion of said shaft to provide said resilient clamping engagement.

3. A tone arm connection according to claim 2 wherein said spring is connected to said brace and said slide member remote from said shaft for inducing a torque between said brace and said slide member.

4. A tone arm connection according to claim 3 further comprising adjustment means interconnecting said brace and said slide means for regulating the lateral positioning therebetween thereby regulating the positioning of said tone arm with respect to said support shaft.

5. A tone arm connection according to claim 4 wherein the shape of said notch in radial cross-section is concave thereby insuring two point contact between said shaft and said slide member.

References Cited

FOREIGN PATENTS 250,694 7/1948 Switzerland.

HARRY N. HAROIAN, *Primary Examiner.*